United States Patent
Seta et al.

(10) Patent No.: US 12,221,135 B2
(45) Date of Patent: Feb. 11, 2025

(54) VEHICLE CONTROLLER, METHOD, AND COMPUTER PROGRAM FOR CONTROLLING VEHICLE

(71) Applicant: TOYOTA JIDOSHA KABUSHIKI KAISHA, Toyota (JP)

(72) Inventors: Takahiro Seta, Yokohama (JP); Ryuta Hashimoto, Tokyo-to (JP); Kota Harada, Tokyo-to (JP); Soichi Yoshino, Ichikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 18/184,140

(22) Filed: Mar. 15, 2023

(65) Prior Publication Data

US 2023/0373535 A1  Nov. 23, 2023

(30) Foreign Application Priority Data

May 17, 2022 (JP) .................... 2022-080866

(51) Int. Cl.
*B60W 60/00* (2020.01)
*B60W 40/06* (2012.01)

(52) U.S. Cl.
CPC ........ *B60W 60/0053* (2020.02); *B60W 40/06* (2013.01); *B60W 60/0059* (2020.02); *B60W 2552/00* (2020.02); *B60W 2556/45* (2020.02)

(58) Field of Classification Search
None
See application file for complete search history.

(56) References Cited

U.S. PATENT DOCUMENTS

| | | | |
|---|---|---|---|
| 12,103,536 B2 * | 10/2024 | Münning | G08G 1/096741 |
| 2018/0059661 A1 | 3/2018 | Sato et al. | |
| 2018/0348779 A1 | 12/2018 | Oniwa | |
| 2020/0312155 A1 * | 10/2020 | Kelkar | B60W 60/005 |
| 2023/0152120 A1 * | 5/2023 | Ikeda | G01C 21/3815 |
| | | | 701/450 |

FOREIGN PATENT DOCUMENTS

| | | |
|---|---|---|
| JP | 2017-045356 A | 3/2017 |
| JP | 2018-032321 A | 3/2018 |
| JP | 2018-202966 A | 12/2018 |
| JP | 2019-117059 A | 7/2019 |

\* cited by examiner

*Primary Examiner* — James J Lee
*Assistant Examiner* — Jonathan E Reinert
(74) *Attorney, Agent, or Firm* — Oliff PLC

(57) ABSTRACT

A vehicle controller detects a travel lane on which a vehicle is traveling, and determines whether the position of the detected travel lane relative to an edge of a road may differ from an actual position. The vehicle controller further identifies first control of the vehicle required on the travel lane and second control of the vehicle required on an adjoining lane. The vehicle controller transfers control of the vehicle to a driver in the case where the position of the detected travel lane may differ from the actual position and where both the first control and the second control may compromise safety of the vehicle or prevent completion of a predetermined action to be completed before reaching a predetermined distance.

14 Claims, 9 Drawing Sheets

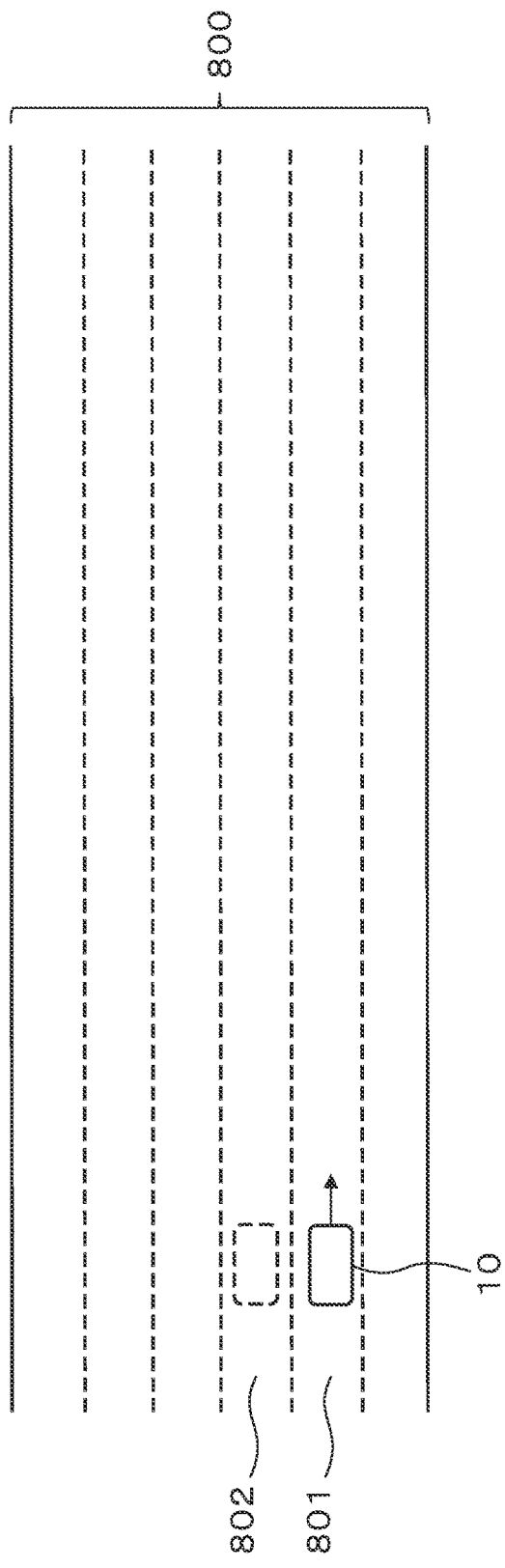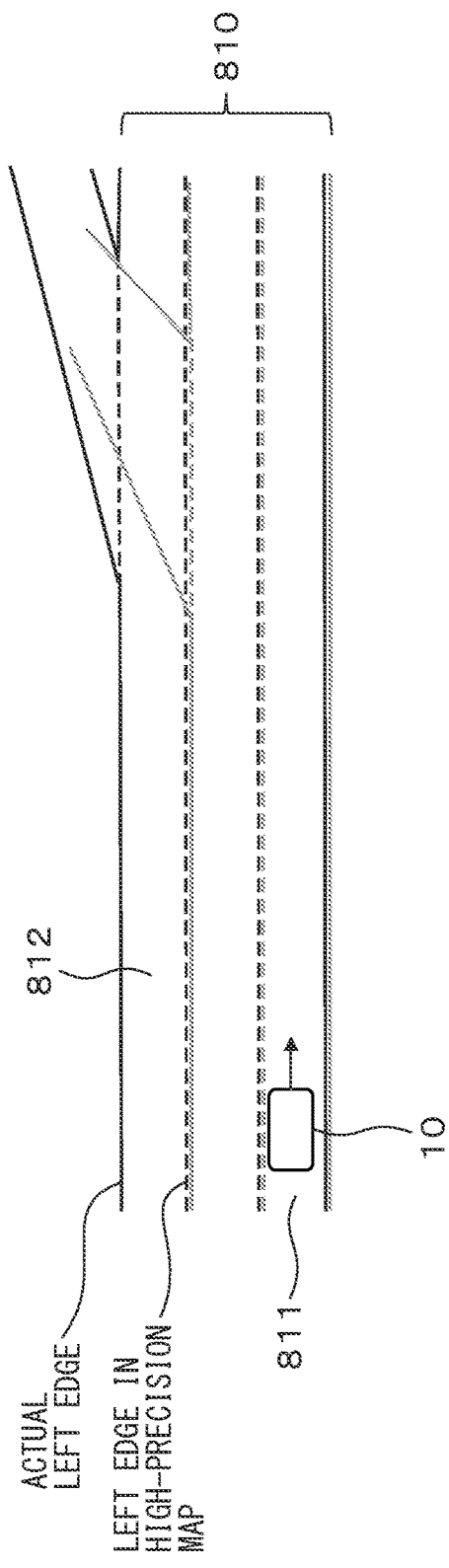

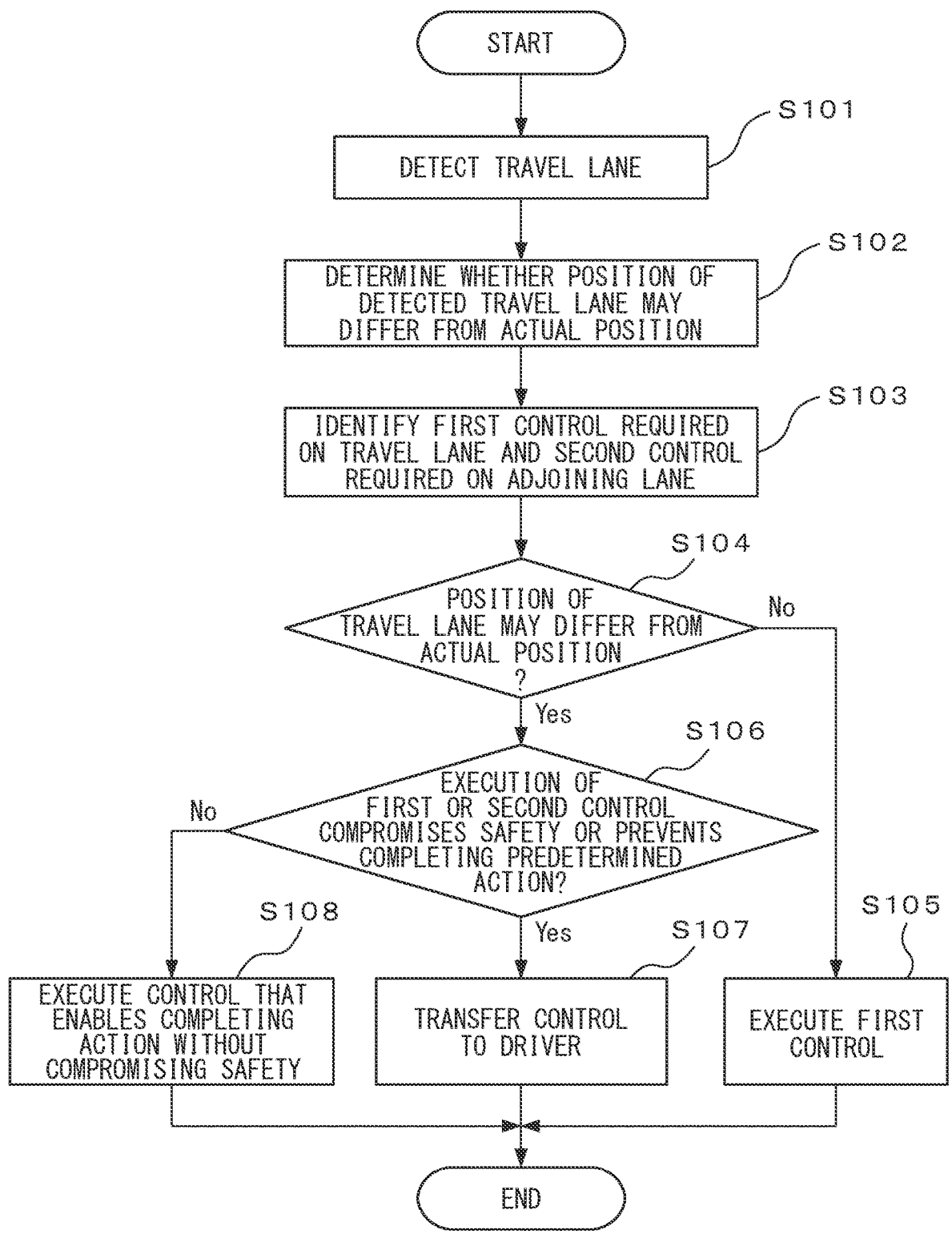

VEHICLE CONTROLLER, METHOD, AND COMPUTER PROGRAM FOR CONTROLLING VEHICLE

FIELD

The present invention relates to a vehicle controller, a method, and a computer program for controlling a vehicle.

BACKGROUND

In autonomous driving control of a vehicle, a vehicle controller executes a localization process for detecting a lane on which the vehicle is traveling (hereafter "travel lane"), and executes vehicle control, including a lane change, as necessary, based on the result of the localization process. For appropriate autonomous driving control of a vehicle, a technique for accurately detecting a travel lane has been proposed (see Japanese Unexamined Patent Publication JP2017-45356A).

A vehicle controller disclosed in JP2017-45356A recognizes dividing lines demarcating a travel path, and estimates first parameters as travel path parameters for identifying the travel path, based on the recognized dividing lines. The vehicle controller further recognizes a leading vehicle ahead of a host vehicle, estimates the trajectory of the recognized leading vehicle, based on a record of the position of the leading vehicle, and estimates second parameters as the travel path parameters, based on the estimated trajectory. In addition, the vehicle controller calculates first confidence levels of the estimated first parameters and second confidence levels of the estimated second parameters. For each of the travel path parameters, the vehicle controller further integrates the first and second parameters, depending on the first and second confidence levels, to calculate an integration parameter. The vehicle controller then estimates the travel path, based on the calculated integration parameters, and assists in driving the host vehicle, based on the integration parameters. The vehicle controller changes the degree of driving assistance, depending on integrated confidence levels.

SUMMARY

In some cases, a vehicle controller may have difficulty in correctly detecting a travel lane even by the technique disclosed in JP2017-45356A. For example, when a lane-dividing line is blurred, it is difficult to correctly detect a travel lane. In the case of such difficulty in detecting a travel lane, control of a vehicle that should not be executed may be automatically executed.

It is an object of the present invention to provide a vehicle controller that can prevent automatic execution of control that should not be executed, even if the result of detection of a travel lane is incorrect.

According to an embodiment, a vehicle controller is provided. The vehicle controller includes a processor configured to: compare a sensor signal representing surroundings of a vehicle with a map including information on lanes of a road being traveled by the vehicle to detect a travel lane being traveled by the vehicle among the lanes, the sensor signal being obtained by a sensor mounted on the vehicle, determine whether the position of the detected travel lane relative to an edge of the road may differ from an actual position, identify first control of the vehicle to be executed on the travel lane and second control of the vehicle to be executed on an adjoining lane adjoining the travel lane, based on at least one of the sensor signal, the map, and a predetermined action of the vehicle to be completed before the vehicle reaches a predetermined location that is a predetermined distance away from the current position of the vehicle, and transfer control of the vehicle to a driver in the case where the position of the detected travel lane may differ from the actual position and where both the first control and the second control may compromise safety of the vehicle or prevent completion of the predetermined action.

The processor of the vehicle controller preferably determines that both the first control and the second control may compromise safety of the vehicle or prevent completion of the predetermined action, in the case where execution of the first control compromises safety of the vehicle or prevents execution of the predetermined action when the vehicle is actually traveling on the adjoining lane, and where execution of the second control compromises safety of the vehicle or prevents execution of the predetermined action when the vehicle is actually traveling on the travel lane.

The processor of the vehicle controller preferably determines that the position of the detected travel lane relative to the edge of the road being traveled by the vehicle may differ from the actual position, when construction information received from another device indicates that road construction is carried out during a predetermined period including the current time in a section from the current position of the vehicle to a predetermined distance away.

Alternatively, the processor preferably determines that the position of the detected travel lane relative to the edge of the road being traveled by the vehicle may differ from the actual position, when the date and time of the latest update of the map is a predetermined period or more earlier than the current time or when the map and a route-search-purpose map used by a navigation device for searching for a travel route of the vehicle differ in road structure in a section from the current position of the vehicle to a predetermined distance away.

Alternatively, the processor preferably determines that the position of the detected travel lane relative to the edge of the road being traveled by the vehicle may differ from the actual position, when a trajectory of another vehicle in a section from the current position of the vehicle to a predetermined distance away lies on an area in the map impassable to the vehicle.

Alternatively, the processor preferably determines that the position of the detected travel lane relative to the edge of the road being traveled by the vehicle may differ from the actual position, until a certain time elapses or the vehicle travels a certain distance from the start of detection of the travel lane.

In addition, the processor preferably determines that the position of the detected travel lane relative to the edge of the road being traveled by the vehicle may differ from the actual position, when the number of lanes represented in the map or the sensor signal at the current position of the vehicle is not less than a predetermined number and the detected travel lane is located within a predetermined range of the center of lanes at the current position.

Further, the processor preferably determines that the position of the detected travel lane relative to the edge of the road being traveled by the vehicle may differ from the actual position, when the number of lanes at the current position differs from the number of lanes at the position of the vehicle a predetermined time ago by a predetermined number or more.

Furthermore, the processor preferably determines that the position of the detected travel lane relative to the edge of the road being traveled by the vehicle may differ from the actual position, when the position of a predetermined feature detected from the sensor signal differs from the position of a corresponding feature in the map relative to the position of the detected travel lane.

Moreover, the processor preferably determines that the position of the detected travel lane relative to the edge of the road being traveled by the vehicle may differ from the actual position, when a confidence score of a predetermined feature detected from the sensor signal is not higher than a predetermined confidence score threshold.

Also, the processor preferably determines that the position of the detected travel lane relative to the edge of the road being traveled by the vehicle may differ from the actual position, when no vehicle traveling in an area represented by the sensor signal can be detected during a certain period. The area corresponds to an area in the map passable by the vehicle relative to the position of the detected travel lane.

Lastly, the processor preferably determines that the position of the detected travel lane relative to the edge of the road being traveled by the vehicle may differ from the actual position, when the current position of the vehicle is within a predetermined range of an error occurrence point predefined in the map.

According to another embodiment, a method for controlling a vehicle is provided. The method includes: comparing a sensor signal representing surroundings of the vehicle with a map including information on lanes of a road being traveled by the vehicle to detect a lane being traveled by the vehicle among the lanes, the sensor signal being obtained by a sensor mounted on the vehicle; determining whether the position of the detected travel lane relative to an edge of the road may differ from an actual position; identifying first control of the vehicle to be executed on the travel lane and second control of the vehicle to be executed on an adjoining lane adjoining the travel lane, based on at least one of the sensor signal, the map, and a predetermined action of the vehicle to be completed before the vehicle reaches a predetermined location that is a predetermined distance away from the current position of the vehicle; and transferring control of the vehicle to a driver in the case where the position of the detected travel lane may differ from the actual position and where both the first control and the second control may compromise safety of the vehicle or prevent completion of the predetermined action.

According to still another embodiment, a non-transitory recording medium that stores a computer program for controlling a vehicle is provided. The computer program includes instructions causing a processor mounted on the vehicle to execute a process including: comparing a sensor signal representing surroundings of the vehicle with a map including information on lanes of a road being traveled by the vehicle to detect a lane being traveled by the vehicle among the lanes, the sensor signal being obtained by a sensor mounted on the vehicle; determining whether the position of the detected travel lane relative to an edge of the road may differ from an actual position; identifying first control of the vehicle to be executed on the travel lane and second control of the vehicle to be executed on an adjoining lane adjoining the travel lane, based on at least one of the sensor signal, the map, and a predetermined action of the vehicle to be completed before the vehicle reaches a predetermined location that is a predetermined distance away from the current position of the vehicle; and transferring control of the vehicle to a driver in the case where the position of the detected travel lane may differ from the actual position and where both the first control and the second control may compromise safety of the vehicle or prevent completion of the predetermined action.

The vehicle controller according to the present invention has an advantageous effect of being able to prevent automatic execution of control that should not be executed even if the result of detection of a travel lane is incorrect.

BRIEF DESCRIPTION OF DRAWINGS

FIG. 8A illustrates an example in which the position of a detected travel lane relative to an edge of a road differs from an actual position.

FIG. 8B illustrates an example in which the position of a detected travel lane relative to an edge of a road differs from an actual position.

FIG. 9 is an operation flowchart of the vehicle control process.

DESCRIPTION OF EMBODIMENTS

A vehicle controller, a method for vehicle control executed by the vehicle controller, and a computer program for vehicle control will now be described with reference to the attached drawings. The vehicle controller detects a travel lane on which a vehicle is traveling among lanes of a road being traveled by the vehicle, by comparing a sensor signal representing the surroundings of the vehicle and obtained by a sensor mounted on the vehicle with a map including information on the lanes. The vehicle controller then determines whether the position of the detected travel lane relative to an edge of the road being traveled by the vehicle may differ from an actual position. In addition, the vehicle controller identifies control of the vehicle to be executed on the detected travel lane and a lane adjoining the travel lane. When the position of the detected travel lane may differ from the actual position, the vehicle controller determines whether execution or non-execution of the identified control compromises safety of the vehicle or leads to completion of a predetermined action to be completed before reaching a predetermined distance. The vehicle controller transfers control of the vehicle to a driver when execution of the control required on any of the lanes may compromise safety of the vehicle or prevent completion of the predetermined action, depending on whether the position of the detected travel lane is correct or differs from the actual position. In this way, the vehicle controller can prevent automatic execution of control that should not be executed even if the result of detection of a travel lane is incorrect.

FIGS. 1 to 4 illustrate examples in which execution of control required on a detected travel lane and an adjoining lane compromises safety of a vehicle or prevents completion of a predetermined action, depending on the relationship between the position of the detected travel lane and an actual position.

Figure 1:
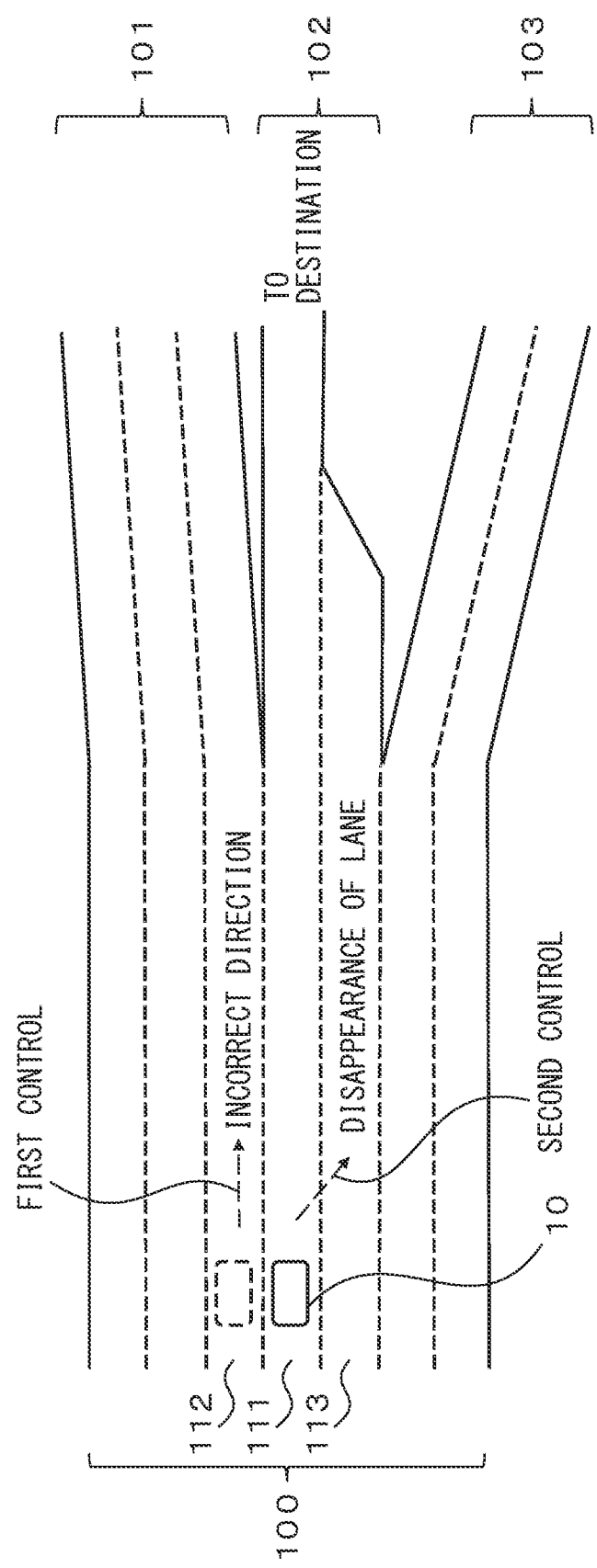
FIG. 1 illustrates an example in which execution of control required on a detected travel lane and an adjoining lane compromises safety of a vehicle or prevents completion of a predetermined action, depending on the relationship between the position of the detected travel lane and an actual position.

In the example illustrated in FIG. 1, a road 100 being traveled by a vehicle 10 splits into roads 101 to 103 in three directions ahead of the vehicle 10. Assume that, of the roads 101 to 103 in three directions, the vehicle 10 needs to head for the middle road 102 to go to a destination. In other words, heading for the middle road 102 before the roads 101 to 103 diverge is a predetermined action required of the vehicle 10. Assume that the fourth lane 111 from the right is detected as a travel lane. Since the vehicle 10 only has to travel along the lane 111 to go to a destination, control required of the vehicle 10 on the detected travel lane is to keep the lane. Meanwhile, control required on a lane 112 adjoining the detected travel lane 111 on the left is to make a lane change to the right lane. In the following, control required of the vehicle 10 on a detected travel lane will be referred to as "first control," and control required of the vehicle 10 on a lane adjoining the detected travel lane as "second control." If the first control is executed to cause the vehicle 10 to keep the lane, when the actual travel lane is the lane 112, the vehicle 10 will head for the road 101, which does not tend to the destination, and the predetermined action will not be completed. If the second control is executed to cause the vehicle 10 to make a lane change to the right lane, when the position of the detected travel lane is correct, the vehicle 10 will move to a lane 113 adjoining the lane 111 on the right. Since the lane 113 ends ahead of the vehicle 10, a lane change to the lane 113 may compromise safety of the vehicle 10. Thus, both the first control and the second control may compromise safety of the vehicle or prevent completion of the predetermined action, depending on the relationship between the position of the detected travel lane and the actual position.

Figure 2:
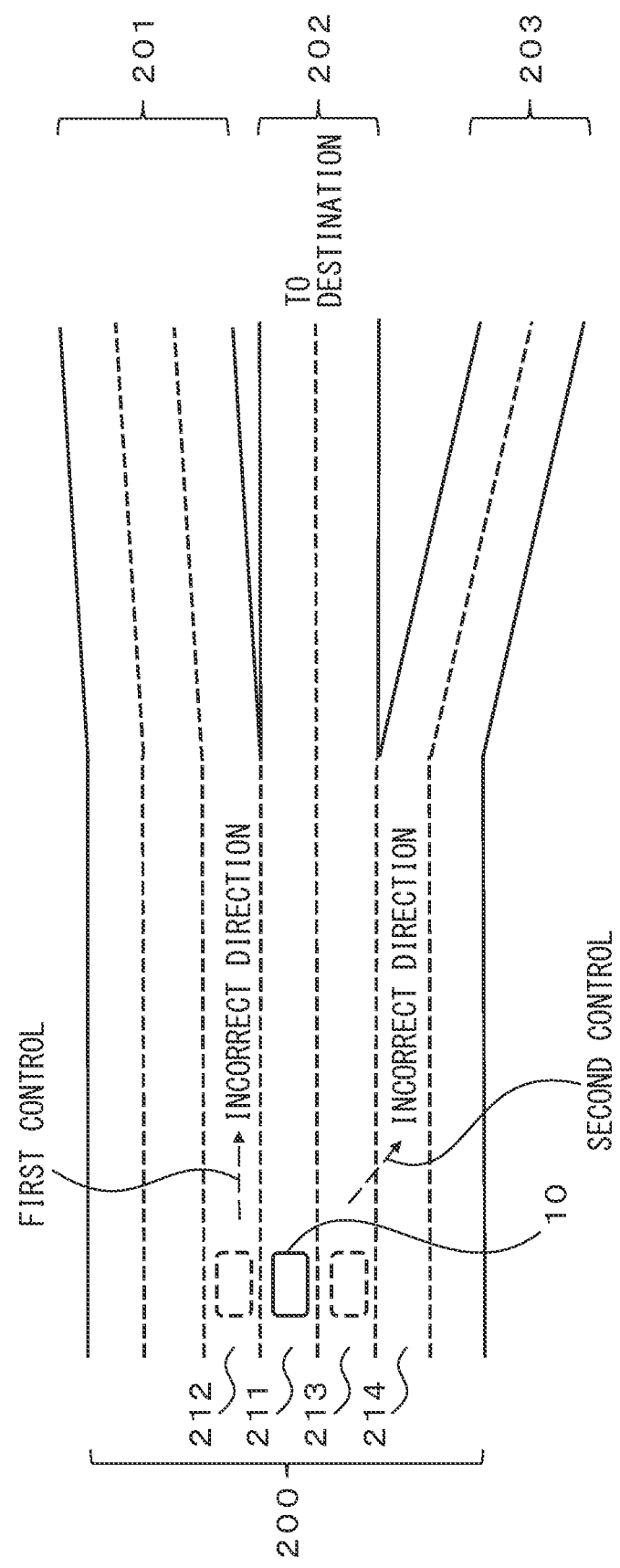
FIG. 2 illustrates another example in which execution of control required on a detected travel lane and an adjoining lane compromises safety of a vehicle or prevents completion of a predetermined action, depending on the relationship between the position of the detected travel lane and an actual position.

In the example illustrated in FIG. 2 also, a road 200 being traveled by a vehicle 10 splits into roads 201 to 203 in three directions ahead of the vehicle 10. Assume that, of the roads 201 to 203 in three directions, the vehicle 10 needs to head for the middle road 202 to go to a destination. In other words, heading for the middle road 202 before the roads 201 to 203 diverge is a predetermined action required of the vehicle 10. Assume that the fourth lane 211 from the right is detected as a travel lane. Since the vehicle 10 only has to travel along the lane 211 in order to go to a destination, control required of the vehicle 10 on the detected travel lane (first control) is to keep the lane. Meanwhile, control required on a lane 212 adjoining the detected travel lane 211 on the left (second control) is to make a lane change to the right lane. If the first control is executed to cause the vehicle 10 to keep the lane, when the actual travel lane is the lane 212, the vehicle 10 will head for the road 201, which does not tend to the destination, and the predetermined action will not be completed. If the second control is executed to cause the vehicle 10 to make a lane change to the right lane, when the actual travel lane is a lane 213 adjoining the lane 211 on the right, the predetermined action will not be completed because the destination lane 214 connects to the road 203, which does not tend to the destination. Thus, both the first control and the second control may prevent completion of the predetermined action, depending on the relationship between the position of the detected travel lane and the actual position.

The same may hold true in the case where the road 200 has an intersection ahead at which vehicles can go straight only on the lanes 211 and 213 whereas the lanes 212 and 214 are a left-turn lane and a right-turn lane, respectively.

Figure 3:
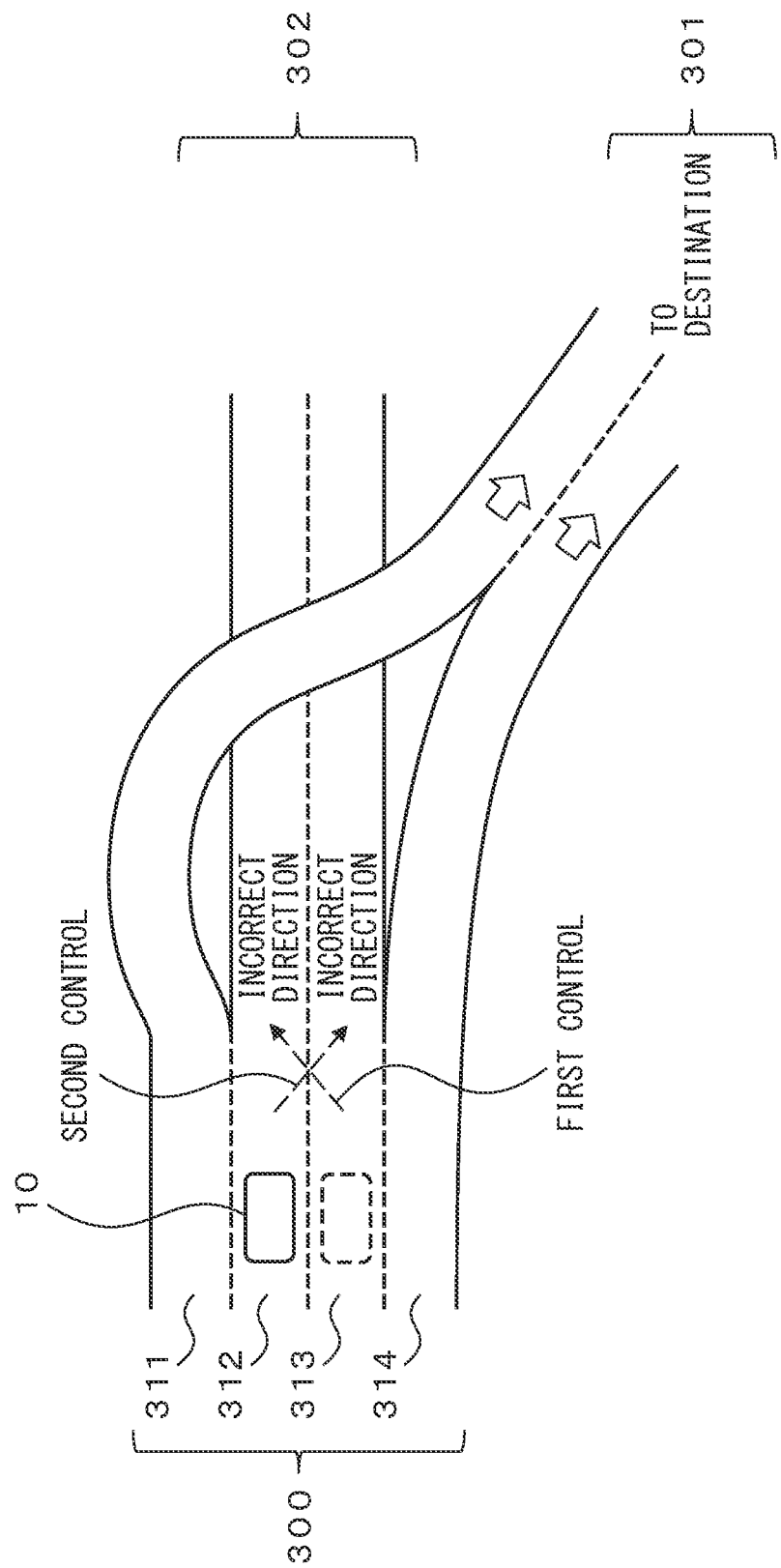
FIG. 3 illustrates still another example in which execution of control required on a detected travel lane and an adjoining lane compromises safety of a vehicle or prevents completion of a predetermined action, depending on the relationship between the position of the detected travel lane and an actual position.

In the example illustrated in FIG. 3, a road 300 being traveled by a vehicle 10 splits into roads 301 and 302 in two directions ahead of the vehicle 10. Lanes 311 and 314 on either edge connect to the road 301 tending rightward whereas middle lanes 312 and 313 connect to the road 302 extending straight. Assume that the vehicle 10 needs to travel along the road 301 tending rightward to go to a destination. In other words, heading for the road 301 before the roads 301 and 302 diverge is a predetermined action required of the vehicle 10. Assume that the second lane 312 from the left is detected as a travel lane. Since the vehicle 10 needs to make a lane change to the lane 311 adjoining the lane 312 on the left to go to a destination, control required of the vehicle 10 on the detected travel lane (first control) is to make a lane change to the left. Meanwhile, control required on the lane 313 adjoining the detected travel lane 312 on the right (second control) is to make a lane change to the right lane. If the first control is executed to cause the vehicle 10 to make a lane change to the left, when the actual travel lane is the lane 313, the vehicle 10 will head for the road 302, which does not tend to the destination, and the predetermined action will not be completed. If the second control is executed to cause the vehicle 10 to make a lane change to the right lane, when the position of the detected travel lane is correct, the predetermined action will not be completed because the destination lane 313 connects to the road 302, which does not tend to the destination. Thus, both the first control and the second control may prevent completion of the predetermined action, depending on the relationship between the position of the detected travel lane and the actual position.

Figure 4:
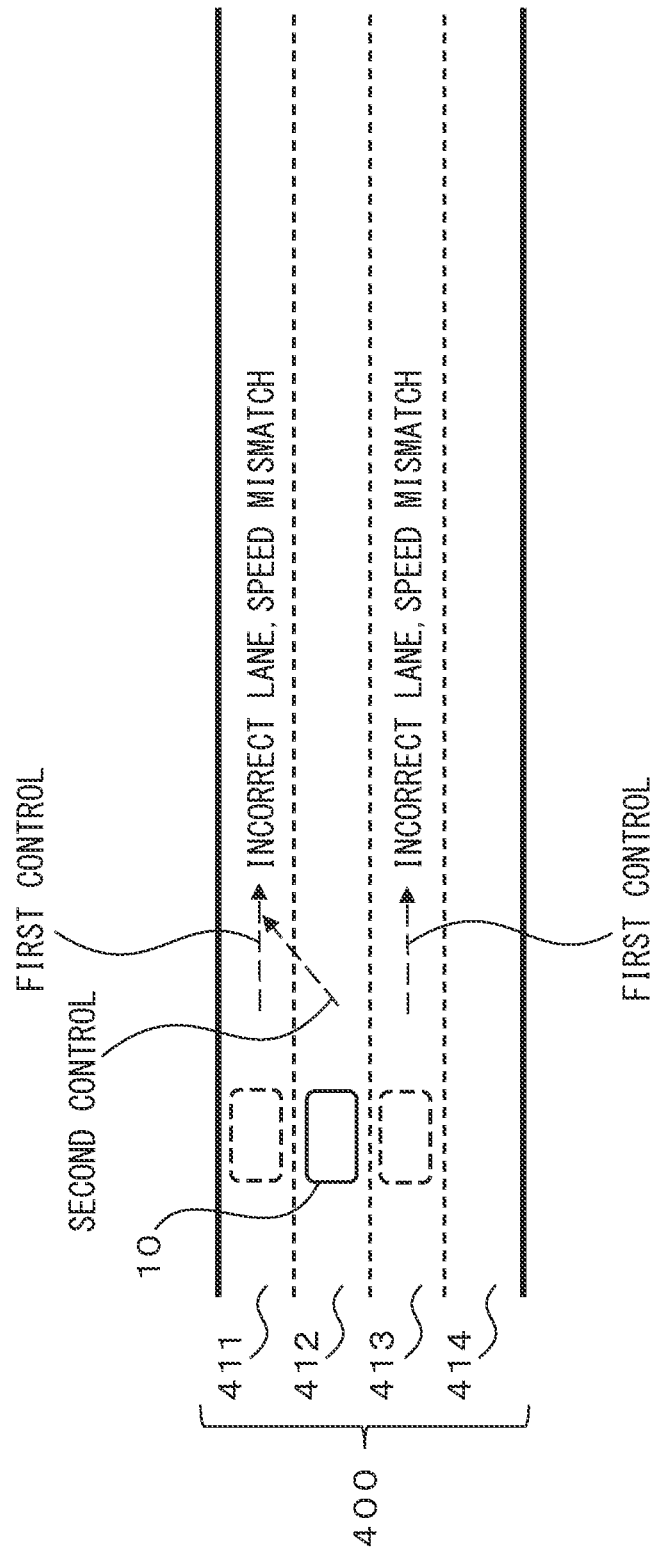
FIG. 4 illustrates yet another example in which execution of control required on a detected travel lane and an adjoining lane compromises safety of a vehicle or prevents completion of a predetermined action, depending on the relationship between the position of the detected travel lane and an actual position.

In the example illustrated in FIG. 4, a road 400 being traveled by a vehicle 10 includes four lanes 411 to 414 where vehicles travel faster on a right lane than on a left lane. In this example, a predetermined action required of the vehicle 10 is to follow another vehicle traveling on a travel lane and to travel on the second lane 412 from the left. Assume that the lane 412 is detected as a travel lane. In this case, control required of the vehicle 10 on the detected travel lane (first control) is to keep the lane and to match the speed of the vehicle 10 to that of another vehicle traveling on the lane 412. Meanwhile, control required on the lane 413 adjoining the detected travel lane 412 on the right (second control) is to make a lane change to the left lane and to match the speed of the vehicle 10 to that of another vehicle traveling on the left neighboring lane. If the first control is executed to cause the vehicle 10 to keep the lane, when the actual travel lane is the lane 411 or 413, the speed of the vehicle 10 will differ from that of another vehicle traveling on the same lane. Thus, the predetermined action will not be completed, and safety of the vehicle 10 may be compromised. If the second control is executed to cause the vehicle 10 to make a lane change to the left lane, when the position of the detected travel lane is correct, the vehicle 10 will move to the leftmost lane 411. Thus, when the speed of the vehicle 10 is matched to that of another vehicle traveling on the lane 412, the vehicle 10 will travel faster than a leading vehicle traveling ahead of the host vehicle, which may compromise safety of the vehicle 10. If a lane change to the left lane is not made and the vehicle 10 travels along the travel lane, when the actual travel lane of the vehicle 10 is the lane 413, the vehicle 10 will travel slower than a following vehicle traveling behind the host vehicle. Thus, the predetermined action will not be completed, and safety of the vehicle 10 may be compromised. The same may hold true in the case where regulation speeds differ from lane to lane in the example illustrated in FIG. 4.

According to the present embodiment, control of the vehicle 10 is transferred to a driver in any of the cases illustrated in FIGS. 1 to 4, which prevents automatic execution of control that should not be executed even if the result of detection of a travel lane is incorrect.

Figure 5:
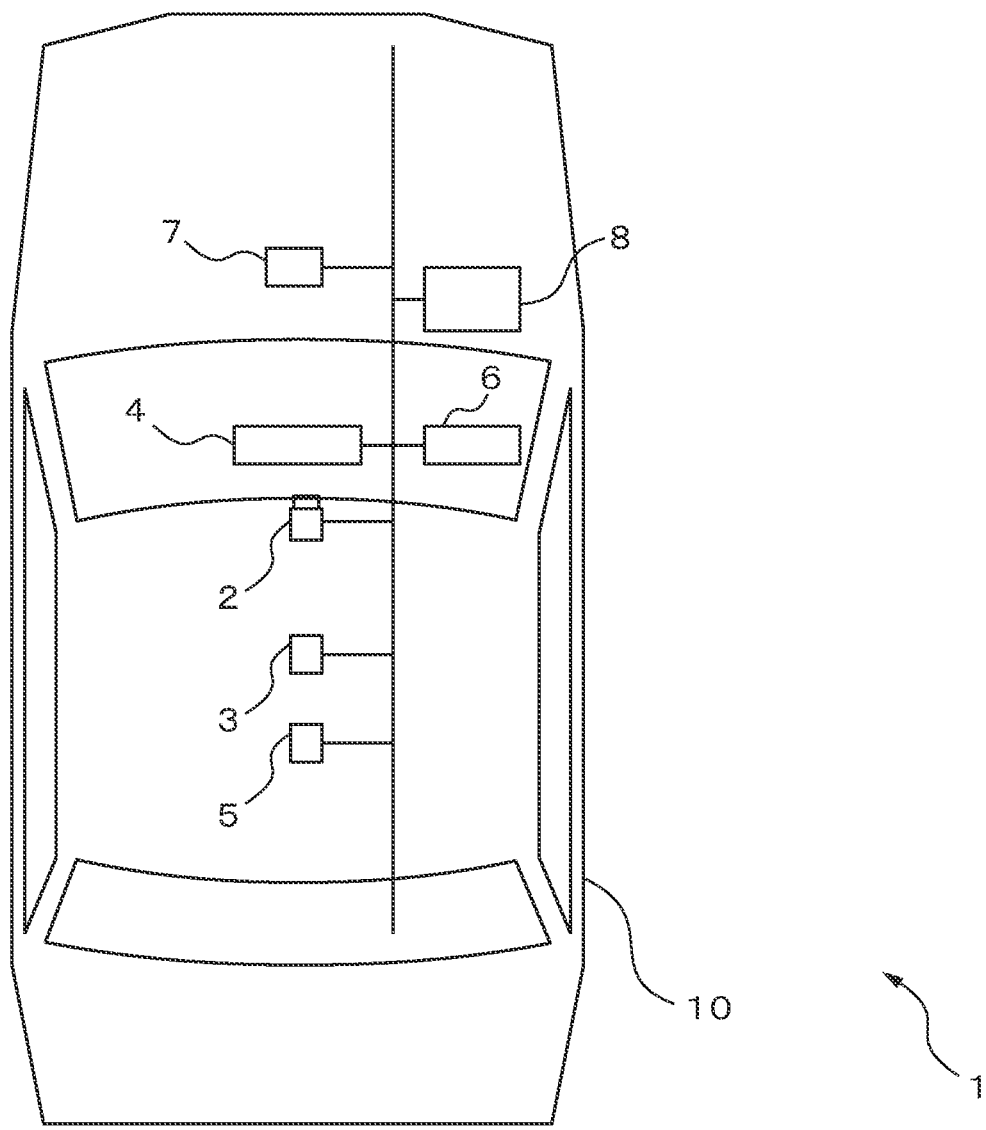
FIG. 5 schematically illustrates the configuration of a vehicle control system equipped with a vehicle controller.
Figure 6:
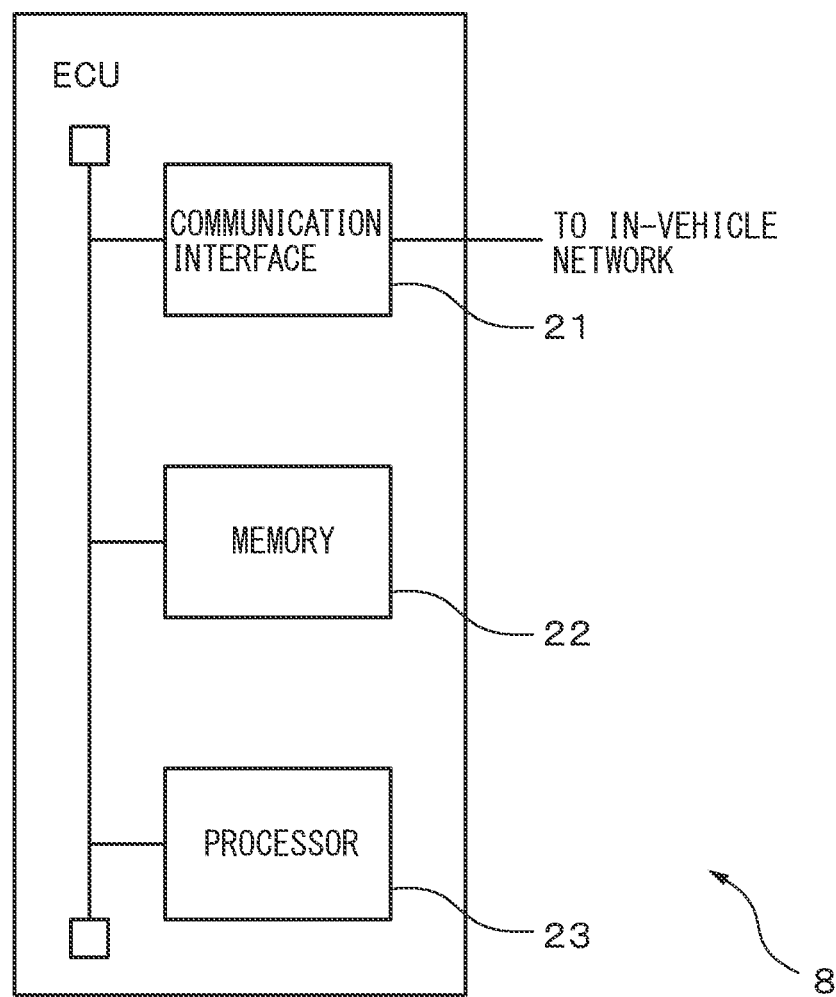
FIG. 6 illustrates the hardware configuration of an electronic control unit, which is an embodiment of the vehicle controller.

FIG. 5 schematically illustrates the configuration of a vehicle control system equipped with a vehicle controller. FIG. 6 illustrates the hardware configuration of an electronic control unit, which is an embodiment of the vehicle controller. In the present embodiment, the vehicle control system 1 is mounted on a vehicle 10 and controls the vehicle 10. To achieve this, the vehicle control system 1 includes a camera 2, a GPS receiver 3, a navigation device 4, a wireless communication device 5, a user interface 6, a storage device 7, and an electronic control unit (ECU) 8, which is an example of the vehicle controller. The camera 2, the GPS receiver 3, the navigation device 4, the wireless communication device 5, the user interface 6, and the storage device 7 are communicably connected to the ECU 8 via an in-vehicle network conforming to a standard, such as a controller area network. The vehicle control system 1 may further include a distance sensor (not illustrated), such as LiDAR or radar, which measures the distances from the vehicle 10 to objects around the vehicle 10.

The camera 2, which is an example of a sensor that generates a sensor signal representing the surroundings of the vehicle 10, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented, for example, to the front of the vehicle 10. The camera 2 takes a picture of a region in front of the vehicle 10 every predetermined capturing period (e.g., 1/30 to 1/10 seconds), and generates images representing the region. Each image obtained by the camera 2 is an example of the sensor signal. The vehicle 10 may include multiple cameras taking pictures in different orientations or having different focal lengths.

Whenever an image is generated, the camera 2 outputs the generated image to the ECU 8 via the in-vehicle network.

The GPS receiver 3 receives GPS signals from GPS satellites at predetermined intervals, and determines the position of the vehicle 10, based on the received GPS signals. The GPS receiver 3 outputs positioning information indicating the result of determination of the position of the vehicle 10 based on the GPS signals to the navigation device 4 and the ECU 8 via the in-vehicle network at predetermined intervals. Instead of the GPS receiver, the vehicle 10 may include a receiver that receives positioning signals from satellites of another satellite positioning system to determine the position of the vehicle 10.

The navigation device 4 executes a navigation process on the vehicle 10 in accordance with a navigation program executed by the device. For example, when the driver starts the navigation program and inputs a destination of the vehicle 10, the navigation device 4 searches for a travel route of the vehicle 10 from the current position of the vehicle 10 to the destination. To this end, the navigation device 4 refers to a route-search-purpose map stored therein and representing individual road sections and the connection relationship therebetween (hereafter a "road map") to search for a travel route in accordance with a predetermined route searching technique, such as Dijkstra's algorithm. The travel route includes information indicating, for example, a road that the vehicle will travel before reaching the destination, a travel direction at a divergent point on the travel route, and the position of an intersection at which the vehicle will turn right or left. The navigation device 4 can use, for example, the position of the vehicle 10 based on the latest result of determination received from the GPS receiver 3 as the current position of the vehicle 10. Upon determining a travel route of the vehicle 10, the navigation device 4 outputs information indicating the travel route to the ECU 8 via the in-vehicle network.

The wireless communication device 5 communicates with a wireless base station by wireless in conformity with a predetermined standard of mobile communications. The wireless communication device 5 receives traffic information indicating the traffic situation or construction information indicating the state of construction of a road being traveled by the vehicle 10 or an area therearound (e.g., information provided by the Vehicle Information and Communication System) from another device via the wireless base station. The wireless communication device 5 then outputs the received traffic information to the ECU 8 via the in-vehicle network. The construction information includes, for example, information on the places and times of day at which road construction is carried out. The wireless communication device 5 may receive a high-precision map of a predetermined region around the current position of the vehicle 10 used for autonomous driving control from a map server via the wireless base station, and output the received high-precision map to the storage device 7.

The user interface 6, which is an example of a notification unit, includes, for example, a display, such as a liquid crystal display, or a touch screen display. The user interface 6 is mounted in the interior of the vehicle 10, e.g., near an instrument panel, so as to face the driver. The user interface 6 displays various types of information received from the ECU 8 via the in-vehicle network, in the form of an icon or text, to notify the driver of the information. The user interface 6 may include one or more light sources provided on the instrument panel, a speaker mounted in the vehicle interior, or a vibrator provided in the steering wheel or the driver's seat. In this case, the user interface 6 outputs various types of information received from the ECU 8 via the in-vehicle network, in the form of a voice signal, to notify the driver of the information. Alternatively, the user interface 6 may vibrate the vibrator according to a signal received from the ECU 8 via the in-vehicle network to notify the driver of predetermined information with the vibration. Alternatively, the user interface 6 may turn on or blink the light sources according to a signal received from the ECU 8 via the in-vehicle network to notify the driver of predetermined information.

The storage device 7 includes, for example, a hard disk drive, a nonvolatile semiconductor memory, or an optical medium and an access device therefor. The storage device 7 stores a high-precision map, which is an example of the map including information on lanes of a road. The high-precision map includes, for example, information indicating the number of lines, road markings such as lane-dividing lines or stop lines, and traffic signs for each road included in a predetermined region represented in the map. The high-precision map may further include, for each road, information indicating control required of vehicles traveling on lanes of the road and control forbidden vehicles traveling on lanes of the road, on a lane-by-lane basis.

The storage device 7 may further include a processor for executing, for example, a process to update the high-precision map and a process related to a request from the ECU 8 to read out the high-precision map. For example, whenever the vehicle 10 moves a predetermined distance, the storage device 7 may transmit a request to obtain a high-precision map, together with the current position of the vehicle 10, to the map server via the wireless communication device 5, and receive a high-precision map of a predetermined region around the current position of the vehicle 10 from the map server via the wireless communication device 5. When receiving a request from the ECU 8 to read out the high-precision map, the storage device 7 cuts out that portion of the high-precision map stored therein which includes the current position of the vehicle 10 and which represents a region smaller than the predetermined region, and outputs the cut portion to the ECU 8 via the in-vehicle network.

The ECU 8 executes autonomous driving control of the vehicle 10. In the present embodiment, the ECU 8 detects a travel lane on which the vehicle 10 is traveling by comparing an image obtained by the camera 2 with the high-precision map, and determines whether the position of the detected travel lane relative to an edge of a road being traveled by the vehicle 10 may differ from an actual position. The ECU 8 then determines control to be actually executed according to control required on the detected travel lane and control required on a lane adjoining the travel lane, and executes the determined control.

As illustrated in FIG. 6, the ECU 8 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 8 to the in-vehicle network. Whenever an image is received from the camera 2, the communication interface 21 passes the received image to the processor 23. Whenever positioning information is received from the GPS receiver 3, the communication interface 21 passes the positioning information to the processor 23. When a travel route is received from the navigation device 4, the communication interface 21 passes the travel route to the processor 23. When traffic information or other information is received via the wireless communication device 5 from another device, the communication interface 21 passes the received information to the processor 23. Further, the communication interface 21 passes the high-precision map read from the storage device 7 to the processor 23.

The memory 22 includes, for example, volatile and nonvolatile semiconductor memories, and stores various types of data used in a vehicle control process executed by the processor 23. For example, the memory 22 stores parameters of the camera 2 including the focal length, the orientation, and the mounted position as well as various parameters for defining an object-detecting classifier used for detecting, for example, road features. The memory 22 further stores a reference table representing the relationship between the type of road marking or traffic sign and control corresponding thereto. Further, the memory 22 stores a travel route, positioning information of the vehicle 10, images of the surroundings of the vehicle 10, and a high-precision map. Further, the memory 22 temporarily stores various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10 at predetermined intervals.

Figure 7:
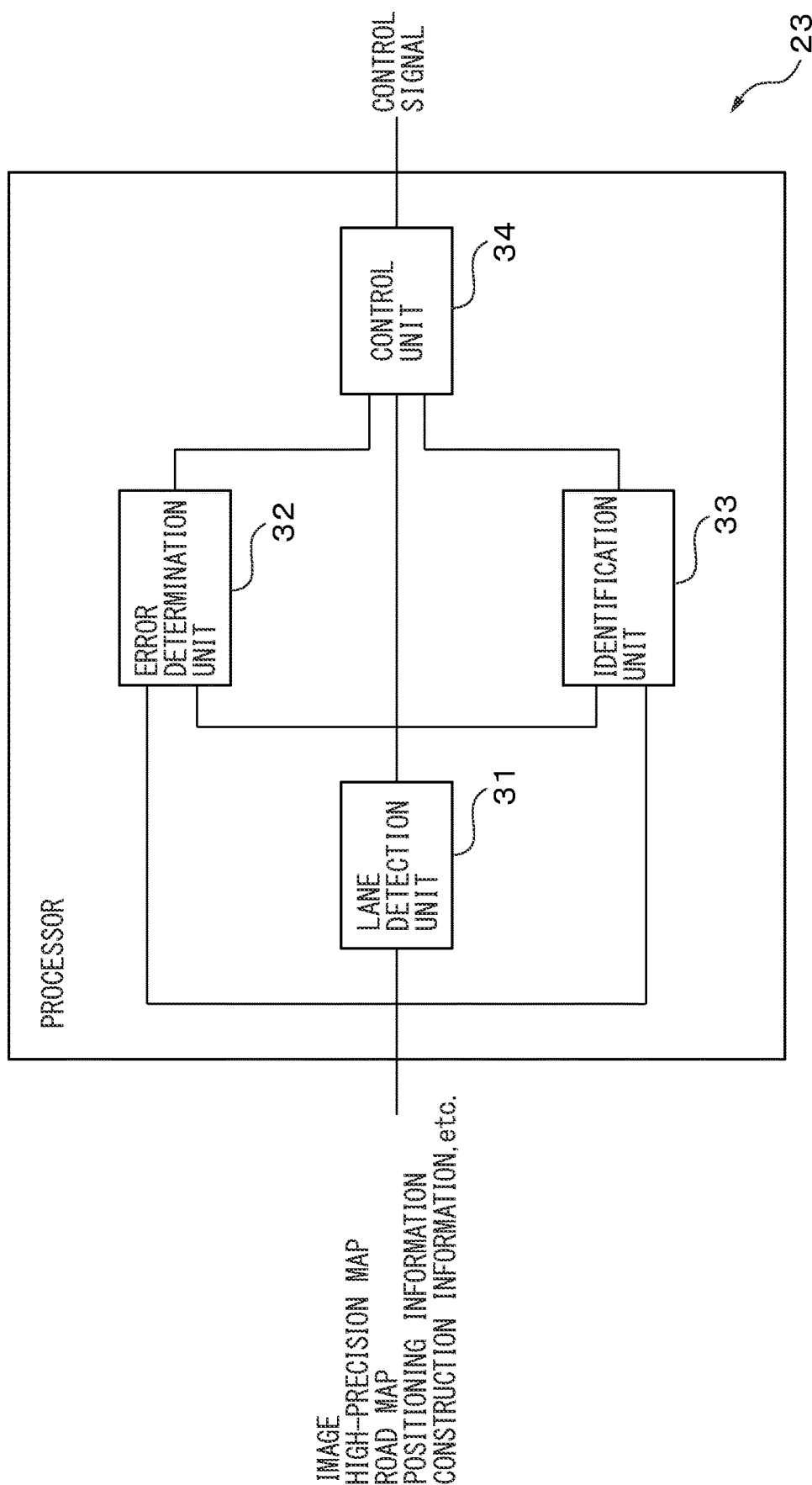
FIG. 7 is a functional block diagram of a processor of the electronic control unit, related to a vehicle control process.

FIG. 7 is a functional block diagram of the processor 23, related to the vehicle control process. The processor 23 includes a lane detection unit 31, an error determination unit 32, an identification unit 33, and a control unit 34. These units included in the processor 23 are, for example, functional modules implemented by a computer program executed by the processor 23, or may be dedicated operating circuits provided in the processor 23.

The lane detection unit 31, which is an example of the detection unit, detects a travel lane on which the vehicle 10 is traveling by comparing an image generated by the camera 2 and representing the surroundings of the vehicle 10 (hereafter simply an "image") with the high-precision map. For example, with an assumption about the position and orientation of the vehicle 10, the lane detection unit 31 projects features on or near the road detected from an image onto the high-precision map or features on or near the road around the vehicle 10 represented in the high-precision map onto the image. The features on or near the road may be, for example, road markings such as lane-dividing lines or stop lines, or curbstones. The lane detection unit 31 then estimates the position of the vehicle 10 to be the position and orientation of the vehicle 10 for the case where the features detected from the image match those represented in the high-precision map the best.

The lane detection unit 31 uses initial values of the assumed position and orientation of the vehicle 10 and parameters of the camera 2, such as the focal length, the height of the mounted position, and the orientation, to determine the positions in the high-precision map or the image to which the features are projected. As the initial values of the position and orientation of the vehicle 10 is used the position of the vehicle 10 measured by the GPS receiver 3 or obtained by correcting, with odometry information, the position and orientation of the vehicle 10 estimated at the last detection of the travel lane. The lane detection unit 31 then calculates the degree of matching between the features on or near the road detected from the image and the corresponding features represented in the high-precision map (e.g., the inverse of the sum of squares of the distances between the corresponding features).

The lane detection unit 31 repeats the above-described process while varying the assumed position and orientation of the vehicle 10. The lane detection unit 31 estimates the actual position of the vehicle 10 to be the position and orientation for the case where the degree of matching is a maximum. The lane detection unit 31 then refers to the high-precision map to identify the lane including the position of the vehicle 10 as the travel lane on which the vehicle 10 is traveling.

For example, the lane detection unit 31 may input an image into a classifier that has been trained to detect detection target features from an image, thereby detecting these features. As such a classifier, the lane detection unit 31 can use, for example, a deep neural network (DNN) having architecture of a convolutional neural network (CNN) type, such as Single Shot MultiBox Detector or Faster R-CNN. Alternatively, as such a classifier, the lane detection unit 31 may use a DNN having architecture of a self-attention network (SAN) type, e.g., a Vision Transformer. The classifier may output confidence scores indicating the degrees of reliability of the respective detected features. The classifier detects a region in the image where a confidence score calculated for a predetermined feature is higher than a predetermined detection threshold, as an object region representing the predetermined feature.

The lane detection unit 31 notifies information indicating the detected travel lane to the error determination unit 32, the identification unit 33, and the control unit 34.

The error determination unit 32 determines whether the position of the travel lane detected by the lane detection unit 31 relative to an edge of the road being traveled by the vehicle 10 may differ from an actual position.

FIGS. 8A and 8B illustrate examples in which the position of a detected travel lane differs from its actual position. In the example illustrated in FIG. 8A, of lanes of a road 800, the vehicle 10 is traveling on the second lane 801 from the right with respect to the travel direction of the vehicle 10. However, a lane 802 adjoining the lane 801 is erroneously detected as a travel lane. Thus the position of the detected travel lane differs from that of the actual travel lane. Such erroneous detection of the travel lane may occur, for example, when the road being traveled by the vehicle 10 has many lanes or when a feature on the road, such as a lane-dividing line, is blurred and thus not easily distinguished. Erroneous detection of the travel lane may also occur when only a relatively short time has elapsed since the start of detection of the travel lane, e.g., when the vehicle 10 has just entered the area covered by the high-precision map.

In the example illustrated in FIG. 8B, of lanes of a road 810, the vehicle 10 is traveling on the rightmost lane 811 with respect to the travel direction of the vehicle 10. In this example, the lane 811 is detected as a travel lane. However, the leftmost lane 812 of the road 810 has been added after the generation of the high-precision map used by the vehicle 10 for detecting the travel lane, and thus the road 810 in the high-precision map does not include the lane 812. As a result, the number of lanes recognized by the lane detection unit 31 between the travel lane 811 and the left edge of the road 810 differs from the actual number of lanes between the travel lane 811 and the actual left edge of the road 810. Thus the position of the detected travel lane relative to the left edge of the road 810 differs from the actual position. Such a discrepancy between the numbers of lanes on the left and right of the detected travel lane in the high-precision map and the actual environment may occur, for example, when the high-precision map is not updated with the latest road information or when construction is carried out on the road.

Thus the error determination unit 32 determines whether the position of the detected travel lane relative to an edge of the road being traveled by the vehicle 10 may differ from the actual position, based on, for example, the structure of the road being traveled by the vehicle 10, circumstances of travel, and timing of generation or update of the high-precision map. More specifically, the error determination unit 32 determines whether the position of the detected travel lane may differ from the actual position, based on any of the determination processes described below. Execution of the determination processes enables the error determination unit 32 to correctly determine whether the position of the detected travel lane relative to an edge of the road being traveled by the vehicle 10 may differ from the actual position. The error determination unit 32 need not execute all of the determination processes described below and only has to execute at least one of them. In the following, the fact that the position of the detected travel lane relative to an edge of the road being traveled by the vehicle 10 differs from the actual position may be simply referred to as "the position of the detected travel lane differs from the actual position."

For example, the error determination unit 32 refers to construction information received from another device via the wireless communication device 5. When the construction information indicates that road construction is carried out during a predetermined period including the current time in a section from the current position of the vehicle 10 to a predetermined distance away, the error determination unit 32 determines that the position of the detected travel lane may differ from the actual position. This is because the road construction may change the number of passable lanes and thus the position of the detected travel lane may differ from the actual position.

In addition, when the date and time of the latest update of the high-precision map is a predetermined period or more earlier than the current time, the error determination unit 32 determines that the position of the detected travel lane may differ from the actual position. Alternatively, when the high-precision map and the road map differ in road structure in a section from the current position of the vehicle 10 to a predetermined distance away, the error determination unit 32 may determine that the position of the detected travel lane may differ from the actual position. This is because the high-precision map does not correctly represent the road structure around the current position of the vehicle 10 and thus the position of the detected travel lane may be mistaken.

Further, when a trajectory of another vehicle traveling ahead of the vehicle 10 in a section from the current position of the vehicle 10 to a predetermined distance away lies on an area in the high-precision map impassable to vehicles, the error determination unit 32 may determine that the position of the detected travel lane may differ from the actual position. This is because the leading vehicle cannot be actually traveling in the impassable area and thus the position of the detected travel lane is probably mistaken.

In this case, the error determination unit 32 detects traveling vehicles around the vehicle 10 from time-series images obtained by the camera 2. To this end, the error determination unit 32 may input the time-series images into a classifier that has been trained to detect a detection target object from an image, thereby detecting vehicles around the vehicle 10 from each of the time-series images. As such a classifier, the error determination unit 32 can use, for example, a DNN having architecture of a CNN or SAN type, similarly to the classifier used by the lane detection unit 31.

The error determination unit 32 tracks the vehicles detected from the time-series images to determine the trajectories of these vehicles. To this end, the error determination unit 32 applies a tracking process based on optical flow, such as the Lucas-Kanade method, to an object region representing a vehicle of interest in the latest image obtained by the camera 2 and object regions in past images, thereby tracking the vehicle represented in the object regions. To achieve this, the error determination unit 32 applies, for example, a filter for extracting feature points, such as SIFT or Harris operator, to the object region of interest, thereby extracting feature points from the object region. The error determination unit 32 then identifies those points in the object regions in the past images which correspond to the feature points in accordance with the applied tracking technique, thereby calculating the optical flow. Alternatively, the error determination unit 32 may apply another tracking technique applied for tracking a moving object detected from an image to the object region of interest in the latest image and the object regions in the past images, thereby tracking the vehicle represented in the object regions.

For each vehicle being tracked, the error determination unit 32 executes viewpoint transformation, using information such as the position at which the camera 2 is mounted on the vehicle 10, thereby transforming the image coordinates of the tracked vehicle into coordinates in an aerial image ("aerial-image coordinates"). To this end, the error determination unit 32 can estimate the position of the detected vehicle at the time of acquisition of each image, using the position and orientation of the vehicle 10, an estimated distance to the detected vehicle, and the direction from the vehicle 10 to the detected vehicle at the time of acquisition of each image. The error determination unit 32 may obtain the position and orientation of the vehicle 10 from the lane detection unit 31. The error determination unit 32 can identify the direction from the vehicle 10 to the detected vehicle, based on the position of the object region including the detected vehicle in the image and the direction of the optical axis of the camera 2. Also, the estimated distance from the vehicle 10 to the detected vehicle is determined on the basis of the real-space size of the detected vehicle and the ratio of the size of the region of the vehicle in the image to a reference size of the vehicle in the image for the case where the distance to the vehicle is equal to a reference distance. The reference distance as well as the reference size in the image and the real-space size of the detected vehicle may be prestored, for example, in the memory 22. In addition, the bottom position of an object region is supposed to correspond to the position at which the vehicle represented in the object region is in contact with the road surface. Thus the error determination unit 32 may estimate the distance to the vehicle represented in the object region, based on the direction from the camera 2 corresponding to the bottom of the object region and the height of the mounted position of the camera 2.

The error determination unit 32 superposes the trajectories of the vehicles determined as described above onto the high-precision map to determine whether these trajectories lie on an area impassable to vehicles. When the trajectory determined for one of the vehicles at least overlaps an area impassable to vehicles, the error determination unit 32 determines that the position of the detected travel lane may differ from the actual position.

Also, the error determination unit 32 may determine that the position of the detected travel lane may differ from the actual position, until a certain time elapses or the vehicle 10 travels a certain distance from the start of detection of the travel lane. This is because the accuracy of detection of the travel lane may be insufficient immediately after the start of the process of detecting the travel lane.

Further, the error determination unit 32 determines whether the number of lanes represented in the high-precision map or an image generated by the camera 2 at the current position of the vehicle 10 is not less than a predetermined number. The predetermined number is set at, for example, any number not less than three, e.g., three to five. When the number of lanes is not less than the predetermined number and the detected travel lane is located within a predetermined range of the center of lanes at the current position of the vehicle 10, the error determination unit 32 determines that the position of the detected travel lane may differ from the actual position. This is because the position of the detected travel lane tends to be incorrect when the vehicle 10 is traveling near the center of a road having many lanes.

Furthermore, when the number of lanes at the current position of the vehicle 10 differs from the number of lanes at the position of the vehicle 10 a predetermined time ago by a predetermined number or more, the error determination unit 32 determines that the position of the detected travel lane may differ from the actual position. This is because the position of the detected travel lane tends to be incorrect at a location where the number of lanes of the road being traveled by the vehicle 10 greatly changes.

Also, when the position of a predetermined feature detected from an image generated by the camera 2 differs from the position of a corresponding feature in the high-precision map relative to the position of the detected travel lane, the error determination unit 32 determines that the position of the detected travel lane may differ from the actual position. This is because such a discrepancy between the positions of a feature in the image and a corresponding feature in the high-precision map is supposed to result from incorrectness of the estimated position of the vehicle 10, which may cause the estimated position of the travel lane to be mistaken. The error determination unit 32 may project features detected from the image onto the high-precision map by a technique similar to estimation of the position of the host vehicle described in relation to the lane detection unit 31, and compare the positions of the features in the image with those of corresponding features in the high-precision map.

Moreover, when a confidence score of a predetermined feature detected from an image generated by the camera 2 is not higher than a predetermined confidence score threshold, the error determination unit 32 determines that the position of the detected travel lane may differ from the actual position. In this case, the confidence score may be one outputted by the classifier used by the lane detection unit 31. The predetermined confidence score threshold is preferably set higher than the detection threshold used by the lane detection unit 31 for detecting features from an image. This is because the accuracy of detection of features around the vehicle 10 is insufficient and thus the estimated position of the travel lane may be mistaken.

Also, the error determination unit 32 detects another vehicle traveling in that area represented in an image generated by the camera 2 which corresponds to an area in the high-precision map passable by the vehicle 10 relative to the position of the detected travel lane. When such another vehicle cannot be detected during a certain period, the error determination unit 32 determines that the position of the detected travel lane may differ from the actual position. It is supposed that other vehicles are traveling in an area in the high-precision map passable by the vehicle 10. Thus, when no vehicle is detected in the area in the image corresponding to the passable area, estimation of the position of the vehicle 10 may be mistaken, which may cause the position of the travel lane to be mistaken. The error determination unit 32 may project the area in the high-precision map passable by the vehicle 10 onto the image by a technique similar to estimation of the position of the host vehicle described in relation to the lane detection unit 31, and determine the area in the image corresponding to the passable area.

Lastly, the high-precision map may include information indicating a location at which detection of the travel lane is likely to fail (hereafter an "error occurrence point"). In this case, when the current position of the vehicle 10 is within a predetermined range of an error occurrence point predefined in the high-precision map, the error determination unit 32 determines that the position of the detected travel lane may differ from the actual position.

The error determination unit 32 notifies the control unit 34 of the result of determination whether the position of the detected travel lane may differ from the actual position.

The identification unit 33 identifies first control of the vehicle 10 to be executed on the detected travel lane. The identification unit 33 further identifies second control of the vehicle 10 to be executed on a lane adjoining the detected travel lane. Specifically, the identification unit 33 identifies the first and second control, based on at least one of an image, the high-precision map, and a predetermined action of the vehicle 10 to be completed before the vehicle 10 reaches a predetermined location that is a predetermined distance away from the current position of the vehicle 10. The second control may be set separately for the adjoining lanes on the left and right of the travel lane. Examples of the first and second control include at least one of the following: maintaining vehicle speed according to speed regulations, stopping a lane change to a lane where entry is prohibited, keeping the lane on which the vehicle is traveling, a lane change to a particular lane, causing the driver to hold the steering wheel and making a HandsOn request to do so, and manual driving and a request for switching to manual driving. Examples of the predetermined action include travel along a lane tending toward a destination, travel at a speed designated by the driver or by laws and regulations, and travel in accordance with laws and regulations regarding a road or a lane.

For example, the identification unit 33 determines to complete movement of the vehicle 10 to a lane tending toward a destination before reaching a location that is a predetermined distance away, as the predetermined action, by referring to a travel route received from the navigation device 4. In this case, the identification unit 33 determines whether the lane tending toward a destination is the same as the detected travel lane, by referring to the high-precision map and the detected travel lane. When the lane tending toward a destination differs from the detected travel lane, the identification unit 33 identifies a lane change to the lane tending toward a destination as the first control. Further, when a lane adjoining the detected travel lane is the same as the lane tending toward a destination, the identification unit 33 identifies travel of the vehicle 10 along the travel lane as the second control. When the lane tending toward a destination is the same as the detected travel lane, the identification unit 33 identifies travel of the vehicle 10 along the travel lane as the first control. Further, when a lane adjoining the detected travel lane differs from the lane tending toward a destination, the identification unit 33 identifies a lane change to the lane tending toward a destination as the second control.

The identification unit 33 may refer to information in the high-precision map indicating control that is set to the detected travel lane, to identify the control indicated by the information as the first control. Similarly, the identification unit 33 may refer to information in the high-precision map indicating control that is set to an adjoining lane, to identify the control indicated by the information as the second control.

Alternatively, the identification unit 33 may detect a road marking or a traffic sign indicating control on the detected travel lane or an adjoining lane from an image generated by the camera 2 to identify the first or second control. In this case, the identification unit 33 inputs the image into a classifier that has been trained to detect a road marking or a traffic sign, thereby detecting a road marking or a traffic sign. As such a classifier, the identification unit 33 can use a classifier similar to that described in relation to feature detection by the lane detection unit 31. Thus the classifier outputs identifying information indicating the type of the detected road marking or traffic sign and information indicating an object region including the road marking or the traffic sign. Alternatively, features detected by the classifier used by the lane detection unit 31 may include a road marking or a traffic sign. In this case, the identification unit 33 receives identifying information of the detected road marking or traffic sign and information indicating an object region including the detected road marking or traffic sign in the image from the lane detection unit 31.

The identification unit 33 determines whether the detected road marking or traffic sign indicates the first or second control, based on the positional relationship between the position of the object region including the detected road marking or traffic sign in the image and lane-dividing lines in the image. To achieve this, the identification unit 33 identifies the areas representing the travel lane and the adjoining lane in the image by projecting the travel lane and the adjoining lane in the high-precision map onto the image by a technique similar to estimation of the position of the host vehicle described in relation to the lane detection unit 31. When the object region including the detected road marking is included in the area representing the travel lane or overlaps with the area to a degree not less than a predetermined threshold, the identification unit 33 determines that the road marking is formed on the travel lane. The identification unit 33 then identifies the control corresponding to the road marking formed on the travel lane by referring to the reference table representing the relationship between the type of road marking and control corresponding to the road marking, and determines the identified control as the first control. Similarly, when the object region including the detected road marking is included in the area representing the adjoining lane or overlaps with the area to a degree not less than the predetermined threshold, the identification unit 33 determines that the road marking is formed on the adjoining lane. The identification unit 33 then identifies the control corresponding to the road marking formed on the adjoining lane by referring to the reference table representing the relationship between the type of road marking and control corresponding to the road marking, and determines the identified control as the second control. In addition, of the signs for individual lanes represented in the detected traffic sign, the identification unit 33 identifies a sign at the same relative position as the detected travel lane among the lanes of the road being traveled by the vehicle 10, as a sign for the travel lane. For example, when the detected travel lane is the second from the right, the identification unit 33 identifies the second sign from the right among the individual signs represented in the detected traffic sign as a sign for the travel lane. Similarly, of the signs for individual lanes represented in the detected traffic sign, the identification unit 33 identifies a sign at the same relative position as the adjoining lane among the lanes of the road being traveled by the vehicle 10, as a sign for the adjoining lane. The identification unit 33 identifies the control corresponding to the traffic sign provided for the travel lane or the adjoining lane by referring to the reference table representing the relationship between the type of traffic sign and control corresponding to the traffic sign, similarly to identification of the first and second control based on a road marking. The identification unit 33 then determines the identified control as the first or second control.

In addition, the identification unit 33 may identify the first control required on the travel lane, based on the situation around the vehicle 10 represented in images. For example, the identification unit 33 detects a vehicle traveling in an area around the vehicle 10 from time-series images by a technique similar to that described in relation to the error determination unit 32, and tracks the detected vehicle. The identification unit 33 may then identify a lane change to an adjoining lane as the first control in the case where the vehicle being tracked is traveling ahead of the vehicle 10 on the travel lane and where the distance between the tracked vehicle and the vehicle 10 decreases with the passage of time and falls below a predetermined distance threshold at a certain time.

The identification unit 33 notifies the control unit 34 of the identified first and second control. When first control or second control is not detected at the current position of the vehicle 10, the identification unit 33 notifies, of these, the undetected control to the control unit 34.

When the position of the detected travel lane does not differ from the actual position, the control unit 34 executes the first control. When the position of the detected travel lane may differ from the actual position, the control unit 34 determines whether both the first control and the second control may compromise safety of the vehicle 10 or prevent completion of the predetermined action. When both the first control and the second control may compromise safety of the vehicle 10 or prevent completion of the predetermined action, the control unit 34 transfers control of the vehicle 10 to the driver.

To achieve this, the control unit 34 determines whether execution of the first control may compromise safety of the vehicle 10 or prevent completion of the predetermined action when the position of the detected travel lane differs from the actual position. In this case, assuming that the vehicle 10 is traveling on a lane adjoining the detected travel lane, the control unit 34 predicts at least one of the lane on which the vehicle 10 will travel and behavior of the vehicle 10 such as the speed for the case where the first control is executed. The control unit 34 then determines whether the predicted lane or behavior satisfies a danger condition for compromise of safety of the vehicle 10 and a non-completion condition for non-completion of the predetermined action, by referring to the travel route, the high-precision map, and an image. When the danger condition is satisfied, the control unit 34 determines that safety of the vehicle 10 may be compromised. When the non-completion condition is satisfied, the control unit 34 determines that the predetermined action may not be completed.

Similarly, the control unit 34 determines whether execution of the second control may compromise safety of the vehicle 10 or prevent completion of the predetermined action when the position of the detected travel lane is correct. In this case, assuming that the vehicle 10 is traveling on the detected travel lane, the control unit 34 predicts at least one of the lane on which the vehicle 10 will travel and behavior of the vehicle 10 such as the speed for the case where the second control is executed. The control unit 34 then determines whether the predicted lane or behavior satisfies the danger condition and the non-completion condition, by referring to the travel route, the high-precision map, and an image. When the danger condition is satisfied, the control unit 34 determines that safety of the vehicle 10 may be compromised. When the non-completion condition is satisfied, the control unit 34 determines that the predetermined action may not be completed.

When it is determined by the above-described process that both the first control and the second control may compromise safety of the vehicle 10 or prevent completion of the predetermined action, the control unit 34 determines to transfer control of the vehicle 10 to the driver. In this case, the control unit 34 notifies the driver of transfer of control of the vehicle 10, via the user interface 6. After a predetermined time from the notification, the control unit 34 transfers control of the vehicle 10 to the driver. After the transfer of control of the vehicle 10 to the driver, the control unit 34 controls travel of the vehicle 10 according to the driver's operation of the accelerator, the brake, and the steering.

When neither the danger condition nor the non-completion condition is satisfied by execution of the first control in the case where the position of the detected travel lane may differ from the actual position, the control unit 34 executes the first control. Similarly, when neither the danger condition nor the non-completion condition is satisfied by execution of the second control in the case where the position of the detected travel lane may differ from the actual position, the control unit 34 executes the second control.

FIG. 9 is an operation flowchart of the vehicle control process executed by the processor 23. The processor 23 executes the vehicle control process in accordance with the operation flowchart described below at predetermined intervals.

The lane detection unit 31 of the processor 23 detects a travel lane on which the vehicle 10 is traveling (step S101). Also, the error determination unit 32 of the processor 23 determines whether the position of the detected travel lane relative to an edge of a road being traveled by the vehicle 10 may differ from an actual position (step S102).

In addition, the identification unit 33 of the processor 23 identifies first control to be executed on the travel lane and second control to be executed on an adjoining lane (step S103).

The control unit 34 of the processor 23 determines whether the result of determination notified by the error determination unit 32 indicates that the position of the detected travel lane may differ from the actual position (step S104). When the result of determination indicates that the position of the detected travel lane does not differ from the actual position (No in step S104), the control unit 34 executes the identified first control (step S105). The control unit 34 then terminates the vehicle control process.

When the result of determination indicates that the position of the detected travel lane may differ from the actual position (Yes in step S104), the control unit 34 determines whether execution of the first or second control may lead to disadvantage. More specifically, the control unit 34 determines whether execution of the first or second control may compromise the safety of the vehicle 10 or prevent completion of a predetermined action (step S106). When execution of any control may compromise safety of the vehicle 10 or prevent completion of the predetermined action (Yes in step S106), the control unit 34 transfers control of the vehicle 10 to the driver (step S107). When execution of either of the first or second control does not compromise safety of the vehicle 10 and leads to completion of the predetermined action (No in step S106), the control unit 34 executes the control (step S108). After step S107 or S108, the processor 23 terminates the vehicle control process.

As has been described above, the vehicle controller determines whether the position of a detected travel lane relative to an edge of a road being traveled by the vehicle may differ from an actual position. In addition, the vehicle controller identifies first control of the vehicle to be executed on the detected travel lane and second control of the vehicle to be executed on a lane adjoining the detected travel lane. When the position of the detected travel lane may differ from the actual position, the vehicle controller determines whether execution of the first and second control leads to disadvantage to the vehicle 10. More specifically, the vehicle controller transfers control of the vehicle 10 to the driver when both the first control and the second control may compromise safety of the vehicle 10 or prevent completion of a predetermined action. In this way, the vehicle controller can prevent automatic execution of control that should not be executed even if the position of the detected travel lane is incorrect.

The computer program for achieving the functions of the processor 23 of the ECU 8 according to the embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A vehicle controller comprising:
   a processor configured to:
   compare a sensor signal representing surroundings of a vehicle with a map including information on lanes of a road being traveled by the vehicle to detect a travel lane being traveled by the vehicle among the lanes, the sensor signal being obtained by a sensor mounted on the vehicle,
   determine whether the position of the detected travel lane relative to an edge of the road may differ from an actual position,
   identify first control of the vehicle to be executed on the travel lane and second control of the vehicle to be executed on an adjoining lane adjoining the travel lane, based on at least one of the sensor signal, the map, and a predetermined action of the vehicle to be completed before the vehicle reaches a predetermined location that is a predetermined distance away from the current position of the vehicle, and
   transfer control of the vehicle to a driver in the case where the position of the detected travel lane may differ from the actual position and where both the first control and the second control may compromise safety of the vehicle or prevent completion of the predetermined action.

2. The vehicle controller according to claim 1, wherein the processor determines that both the first control and the second control may compromise safety of the vehicle or prevent completion of the predetermined action, in the case where execution of the first control compromises safety of the vehicle or prevents execution of the predetermined action when the vehicle is actually traveling on the adjoining lane, and where execution of the second control compromises safety of the vehicle or prevents execution of the predetermined action when the vehicle is actually traveling on the travel lane.

3. The vehicle controller according to claim 1, wherein the processor determines that the position of the detected travel lane relative to the edge of the road may differ from the actual position, when construction information received from another device indicates that road construction is carried out during a predetermined period including the current time in a section from the current position of the vehicle to a predetermined distance away.

4. The vehicle controller according to claim 1, wherein the processor determines that the position of the detected travel lane relative to the edge of the road may differ from the actual position, when the date and time of the latest update of the map is a predetermined period or more earlier than the current time or when the map and a route-search-purpose map used by a navigation device for searching for a travel route of the vehicle differ in road structure in a section from the current position of the vehicle to a predetermined distance away.

5. The vehicle controller according to claim 1, wherein the processor determines that the position of the detected travel lane relative to the edge of the road may differ from the actual position, when a trajectory of another vehicle in a section from the current position of the vehicle to a predetermined distance away lies on an area in the map impassable to the vehicle.

6. The vehicle controller according to claim 1, wherein the processor determines that the position of the detected travel lane relative to the edge of the road may differ from the actual position, until a certain time elapses or the vehicle travels a certain distance from the start of detection of the travel lane.

7. The vehicle controller according to claim 1, wherein the processor determines that the position of the detected travel lane relative to the edge of the road may differ from the actual position, when the number of lanes represented in the map or the sensor signal at the current position of the vehicle is not less than a predetermined number and the detected travel lane is located within a predetermined range of the center of lanes of the road at the current position of the vehicle.

8. The vehicle controller according to claim 1, wherein the processor determines that the position of the detected travel lane relative to the edge of the road may differ from the actual position, when the number of lanes at the current position differs from the number of lanes at the position of the vehicle a predetermined time ago by a predetermined number or more.

9. The vehicle controller according to claim 1, wherein the processor determines that the position of the detected travel lane relative to the edge of the road may differ from the actual position, when the position of a predetermined feature detected from the sensor signal differs from the position of a corresponding feature in the map relative to the position of the detected travel lane.

10. The vehicle controller according to claim 1, wherein the processor determines that the position of the detected travel lane relative to the edge of the road may differ from the actual position, when a confidence score of a predetermined feature detected from the sensor signal is not higher than a predetermined confidence score threshold.

11. The vehicle controller according to claim 1, wherein the processor determines that the position of the detected travel lane relative to the edge of the road may differ from the actual position, when no vehicle traveling in an area represented by the sensor signal can be detected during a certain period, the area corresponding to an area in the map passable by the vehicle relative to the position of the detected travel lane.

12. The vehicle controller according to claim 1, wherein the processor determines that the position of the detected travel lane relative to the edge of the road may differ from the actual position, when the current position of the vehicle is within a predetermined range of an error occurrence point predefined in the map.

13. A method for controlling a vehicle, comprising:
- comparing a sensor signal representing surroundings of the vehicle with a map including information on lanes of a road being traveled by the vehicle to detect a lane being traveled by the vehicle among the lanes, the sensor signal being obtained by a sensor mounted on the vehicle;
- determining whether the position of the detected travel lane relative to an edge of the road may differ from an actual position;
- identifying first control of the vehicle to be executed on the travel lane and second control of the vehicle to be executed on an adjoining lane adjoining the travel lane, based on at least one of the sensor signal, the map, and a predetermined action of the vehicle to be completed before the vehicle reaches a predetermined location that is a predetermined distance away from the current position of the vehicle; and
- transferring control of the vehicle to a driver in the case where the position of the detected travel lane may differ from the actual position and where both the first control and the second control may compromise safety of the vehicle or prevent completion of the predetermined action.

14. A non-transitory recording medium that stores a computer program for controlling a vehicle, the computer program causing a processor mounted on the vehicle to execute a process comprising:
- comparing a sensor signal representing surroundings of the vehicle with a map including information on lanes of a road being traveled by the vehicle to detect a lane being traveled by the vehicle among the lanes, the sensor signal being obtained by a sensor mounted on the vehicle;
- determining whether the position of the detected travel lane relative to an edge of the road may differ from an actual position;
- identifying first control of the vehicle to be executed on the travel lane and second control of the vehicle to be executed on an adjoining lane adjoining the travel lane, based on at least one of the sensor signal, the map, and a predetermined action of the vehicle to be completed before the vehicle reaches a predetermined location that is a predetermined distance away from the current position of the vehicle; and
- transferring control of the vehicle to a driver in the case where the position of the detected travel lane may differ from the actual position and where both the first control and the second control may compromise safety of the vehicle or prevent completion of the predetermined action.

* * * * *